C. H. THORDARSON.

SPARK COIL.

APPLICATION FILED SEPT. 30, 1911.

Reissued Apr. 18, 1916. 14,113.

Witnesses:
E. G. Rawson
R. G. Barrett

Inventor:
Chester H. Thordarson,
By William H. Hall
Atty.

UNITED STATES PATENT OFFICE.

CHESTER H. THORDARSON, OF CHICAGO, ILLINOIS.

SPARK-COIL.

14,113. Specification of Reissued Letters Patent. Reissued Apr. 18, 1916.

Original No. 958,899, dated May 24, 1910, Serial No. 391,023. Application for reissue filed September 30, 1911. Serial No. 652,203.

*To all whom it may concern:*

Be it known that I, CHESTER H. THORDARSON, a citizen of the United States, and a resident of the city of Chicago, county of Cook, and the State of Illinois, have invented certain new and useful Improvements in Spark-Coils; and I do hereby declare the following to be a full, clear, and exact description thereof, reference being made to the accompanying drawings, and to the characters of reference marked thereon, which form part of this specification.

This invention relates to improvements in make and break spark coils for use in ignition systems of explosive engines, of that type embracing a source of direct current supply, as a battery, which is connected in a circuit in series with the winding of the coil, whereby when the circuit is closed upon the winding a portion of the energy developed in the winding is stored up in the magnetic circuit of the winding, which energy, upon the opening of the circuit, as between the electrodes in the engine cylinder, is withdrawn from the magnetic circuit and induces in the winding of the coil an electro-motive force which follows the break in the circuit at the electrodes to produce the igniting spark.

Among the objects of the invention is to provide a make and break coil of simple construction and efficient in operation.

A further object of the invention is to provide a coil of the character referred to having a divided magnetic circuit and a winding of minimum resistance and minimum turns, and therefore of least self-induction, and capable of storing up considerable energy and rapidly dissipating the same in the spark, whereby comparatively little battery power is lost in the production of a spark of ample intensity.

A further object of the invention is to produce an efficient make and break spark coil of reduced weight, size and cost, as compared to the present spark coil practice.

Other objects of the invention will appear more fully hereinafter.

The invention consists substantially in the construction, location and relative arrangement of parts, all as will more fully appear hereinafter, as shown in the accompanying drawing and finally pointed out in the appended claims.

Figure 1:
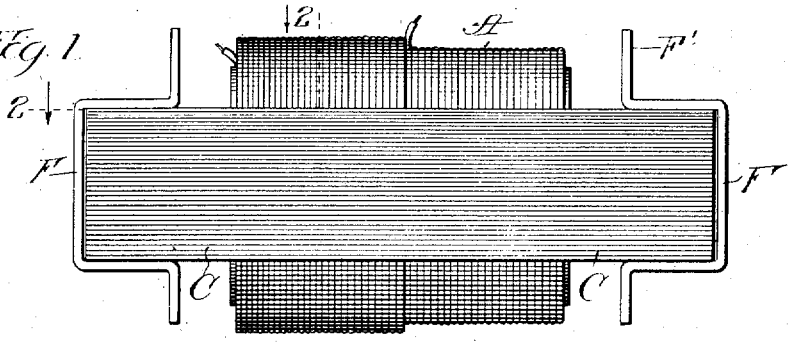
Figure 2:
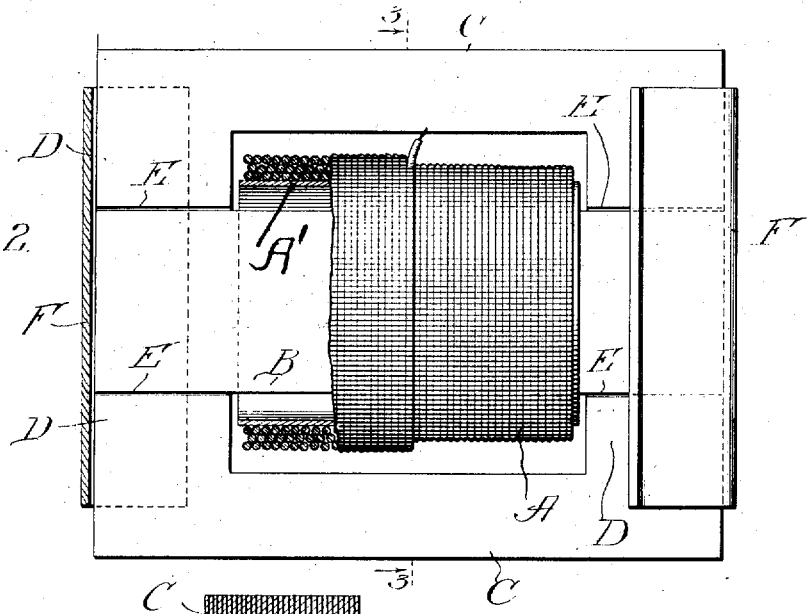
Figure 3:
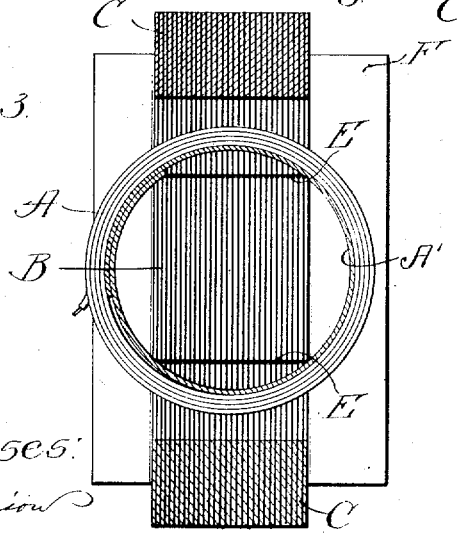
Figure 4:
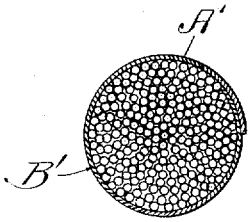

Referring to the accompanying drawing and to the various views and reference signs appearing thereon, Figure 1 is a view in side elevation of an ignition or spark coil embodying the principles of my invention. Fig. 2 is a view partly in top plan and partly in section, on line 2—2, of Fig. 1, looking in the direction of the arrows. Fig. 3 is a view in transverse section on the line 3—3 of Fig. 2, looking in the direction of the arrows. Fig. 4 is a view in transverse section showing a modified construction of the core embraced within the spirit and scope of my invention.

The same part is designated by the same reference sign wherever it occurs throughout the several views.

When a closed ring of uniform transverse sectional area and material is magnetized in such a way that the magnetic flux is parallel with the ring, such a ring, does not demagnetize when the current is broken, even when made of soft iron. Such a ring can be partially demagnetized with hammer blows, and completely demagnetized by current flowing in the opposite direction around it. Such a ring therefore is not the most economical or efficient or desirable for use in connection with ignition, spark or impedance coils for the reason that the stored up energy in the magnetic circuit thereof is not dissipated in the spark, and hence considerable magnetic power is lost, being retained in the iron of the ring. If, however, an air space or gap is provided transversely through the body of the ring, such a ring will demagnetize when the magnetizing circuit is broken, the speed of the demagnetization depending on the quality of the iron in the ring, or the sub-division of the body thereof into laminations or wires. Make and break spark coils employing a magnetic circuit so sub-divided into laminations or wires and having an air gap or gaps formed transversely therethrough at convenient points, when combined with a winding of minimum resistance and composed of a minimum number of turns, attain a high degree of efficiency, in that the spark produced from such a coil is large and hot, with the expenditure of a small consumption of battery power, for the reason that when the electrical circuit in which the winding of the coil is included is broken, the flux of the magnetic circuit rapidly releases or closes on the coil, and augments the spark produced at the break. In other words, energy is quickly stored up in the magnetic circuit, which energy is quickly and efficiently transformed into the spark.

The principles above referred to and outlined may be embodied in many specifically different constructions. While, therefore, I have shown specific forms of apparatus embodying the principles of my invention I desire it to be understood that said principles might be embodied in other specific forms of construction and still fall within the spirit and scope of my invention.

In the particular form shown, A, is a coil or single winding which may be of usual or well known construction and arrangement for use in apparatus of this character, it being shown as wound upon a sleeve or spool A′ of insulating material which surrounds and is mounted in the core B. The said winding A, composed of suitably insulated wire, is wound in a close, compact bundle upon the sleeve A′, with the turns thereof lying one upon the other, both in radial and longitudinal direction, thus contributing to the compactness of the device. The said winding is a low resistance winding so as to afford little resistance to the current induced therein by the reactive force of the magnetism of the magnetic circuit upon the instant of the break in the electric circuit in which the winding is included, so that thereby the induced current is utilized to the fullest extent in the production of a hot, fat spark. In practice, coils adapted for average medium horse power gas engines may be constructed with a winding of twenty gage copper wire of in the neighborhood of two hundred turns, with a resistance of about one-half ohm. In practice, though in this respect my invention is not to be in all cases limited or restricted, I prefer to employ a sub-divided core. In Fig. 3, I have shown the core made up of plates or laminations. In Fig. 4, however, I have shown the core, B′, made up of wire rods or sections. The particular character of sub-divisions of the core is therefore immaterial in the broadest scope of my invention. The laminated form is preferable, however, on account of the cheapness of manufacture.

The magnetic circuit of the coil is completed through one or more side pieces or return members C. As shown, two of these side pieces are employed which extend on diametrically opposite sides of and are disposed in parallel relation with respect to the axis of the coil. Each side piece is shown as provided at its ends with the inwardly turned portions D, the inner faces thereof, constituting pole faces which are presented toward or arranged to bear against the core B, or B′, at opposite ends of the coil, and separated by air spaces or gaps from the core.

In practice and preferably the portions C, are subdivided, though in this respect my invention is not to be limited or restricted, and in the form shown the sub-divisions are in the form of thin laminations or plates.

The side part or parts, C, may be held in assembled relation with respect to the core of the coil in any suitable or convenient manner. I have shown a simple and efficient way for accomplishing this result, consisting of spring channel plates F, preferably of non-magnetizable material, which are slipped over each end of the core and the adjacent ends of the side part or parts C, as clearly shown in the drawing. The clips not only hold the circuit members of the magnet in proper assembled relation, but also hold the laminations or parts of the members assembled. The terminal flanges F′ of the clips F at one side of the coil are shown in Figs. 1 and 3 as extending beyond one side of the winding so that said extended flanges may constitute means by which the coil may be supported, as is evident.

The provision of the air gap or gaps between the contacting or juxtaposed surfaces of the side part or parts C, and the core B, B′, such for instance as is afforded by the interposing therebetween of the insulating strip or strips E, enables the magnetic flux of the magnetic circuit to rapidly release or close on the winding, when the electric circuit in which the winding of the coil is included is broken, whereby the magnetic energy stored up in the metal of the magnetic circuit, when the electric circuit of the coil is so broken, is transformed into heat to augment the spark produced by and at the break in the electric circuit, and which energy so stored up is dissipated in the spark, thereby making the spark longer and hotter, and hence increasing the sparking efficiency of the coil without increasing the consumption of battery power. In other words, by the construction described, I am enabled to avoid the loss due to a failure in utilizing the magnetic flux of the magnetic circuit at the instant the spark is produced. In practice these air gap or gaps are made extremely narrow as, for instance, in the neighborhood of seven-one thousandths of an inch when the coil is employed as an ignition coil for gas engines.

It will be seen that I am enabled to attain the maximum efficiency as to spark production and current comsumption with a coil of least resistance and fewest turns. The problem of producing a hot, fat spark in the cylinder of the modern high speed explosive engines, and with an economical use of battery power, has become more and more complex as the speed of the engines has increased, requiring several sparks per second. This problem has been successfully met by the coil herein shown, inasmuch as the low resistance of the winding and the few turns thereof enables the energy to be stored in the magnetic circuit within a minimum time, and, for a like reason, enables the electromotive force induced in the ignition circuit from the lines of force withdrawn from the magnetic circuit, when the ignition circuit is opened or broken, to quickly, and with ample flame body, jump across the break to produce the spark. This rapidity of storing and of releasing the energy is due to the small resistance against the electro-motive force and the small self-induction between the few turns of the winding thereby producing a coil having a time-constant of low value, and also the quick transformation of magnetic energy is due to the laminated structure and to the transverse air gap or gaps of the magnetic circuit. Thus the characteristics of the winding and the magnetic circuit coöperate one with the other under delicately balanced conditions to the desired end of storing ample energy and fully releasing it in a minimum time. The balancing of the elements in the manner described has the further important effect of greatly reducing the size, weight and cost of the material of said elements.

Having now set forth the object and nature of my invention and constructions embodying the principles thereof, what I claim as new and useful and of my own invention, I desire to secure by Letters Patent, 1. A spark coil having a laminated core, in combination with independent side pieces arranged to bear against the core at the ends thereof, and channel clips engaging the ends of the core and side pieces to retain the same in assembled relation.

2. A spark coil having a core and a subdivided side part formed with pole faces presented toward but separated from the ends of said core and channel plates engaging the ends of said core and side part to hold the same in assembled relation.

3. A spark coil having a core, in combination with independent side pieces having pole faces arranged to bear against the sides of the core at the ends thereof, and means engaging the ends of the core and side pieces to retain the same in assembled relation.

4. A spark coil having a laminated core, in combination with independent side pieces having pole faces arranged to bear against the sides of the core at the ends thereof, and means for engaging the ends of the core and side pieces to retain the same in assembled relation.

5. A spark coil having a core, in combination with independent laminated side pieces having pole faces to bear against the sides of the core at the ends thereof, and means engaging the ends of the core and side pieces to retain the same in assembled relation.

6. A spark coil having a laminated core, in combination with independent laminated side pieces arranged to bear against the sides of the core at the ends thereof, and means engaging the ends of the core and side pieces to retain the same in assembled relation.

7. A spark coil having a core, in combination with independent side pieces having pole faces arranged to bear against the sides of the core at the ends thereof, insulating material interposed between the bearing surfaces of the core and side pieces, and means engaging the ends of the core and side pieces to retain the same in assembled relation.

8. A spark coil having a laminated core, in combination with independent side pieces having pole faces arranged to bear against the sides of the core at the ends thereof, insulating material interposed between the contacting surfaces of the core and side pieces, and means engaging the ends of the core and side pieces to hold the same in assembled relation.

9. A spark coil having a core in combination with independent laminated side pieces having pole faces arranged to bear against the sides of the core at the ends thereof, insulating material interposed between the contacting surfaces of the core and side pieces, and means engaging the ends of the core and side pieces to retain the same in assembled relation.

10. A spark coil having a laminated core in combination with independent laminated side pieces having pole faces arranged to bear against the sides of the core at the ends thereof, insulating material interposed between the contacting surfaces of the core and side pieces, and means engaging the ends of the core and side pieces to retain the same in assembled relation.

11. A spark coil having a core, in combination with independent side pieces arranged in parallel relation with respect to the core and having pole faces at its ends directed toward and bearing against the side of the core at the ends of the latter, and means engaging the ends of the core and side pieces for retaining the same in assembled relation.

12. A spark coil having a core, in combination with independent side pieces arranged on opposite sides of the core and in parallel relation with respect thereto, the ends of the side pieces forming pole faces and being directed toward and bearing against the sides of the core at the ends of the latter, and means engaging the ends of the core and side pieces for retaining the same in assembled relation.

13. A spark coil having a laminated core, in combination with an independent laminated side piece arranged in parallel relation with respect to the core, and having its ends forming pole faces and directed toward and bearing against the side of the core at the ends of the latter, an insulating strip interposed between the bearing surfaces of the core and side pieces, and means engaging the ends of the core and side pieces to retain the same in assembled relation.

14. A spark coil having a laminated core, in combination with independent laminated side pieces, arranged on opposite sides of the core and in parallel relation thereto, said side pieces having their ends forming pole faces and directed toward and bearing against the sides of the core adjacent the ends of the latter, insulating strips interposed between the bearing surfaces of the core and side pieces and means engaging the ends of the core and side pieces to retain the same in assembled relation.

15. A make and break spark coil especially adapted for ignition systems of explosive engines comprising an all laminated magnetic circuit consisting of a core member and a return member, the planes of the laminations being parallel to the path of the magnetic flux, the said magnetic circuit being transversely divided at at least one point in the path of the magnetic flux by a narrow air gap, and a single winding on said core member, said winding being of such low resistance and of such few turns as to rapidly magnetize the core member when the coil is energized and to rapidly transmit the energy induced in the winding upon the opening of the winding circuit into a maximum spark with a minimum loss of impressed energy.

16. A make and break spark coil especially adapted for the ignition systems of explosive engines having a magnetic circuit which consists of an all laminated core member and an all laminated side member disposed generally parallel thereto, the planes of the laminations being parallel to the path of the magnetic flux, said circuit being transversely divided at at least one point in the path of the magnetic flux by a narrow air gap, with means to hold said members and the laminations thereof in assembled relation, and a single winding on said core member, consisting of a suitably insulated wire which is wound in a close compact bundle about the said core member and is insulated therefrom, with the turns thereof lying one upon the other in a radial and longitudinal direction, said winding being of such low resistance and of such few turns as to rapidly energize the magnetic circuit when the winding circuit is closed and to rapidly transmit the energy induced in the winding upon the opening of the winding circuit into a maximum spark with a minimum loss of impressed energy.

17. A make and break spark coil especially adapted for ignition systems of explosive engines, comprising a laminated core of the closed magnetic circuit type having wound thereon a single coil of such few turns and of such low resistance as to possess a time-constant of low value, to thereby rapidly energize the core when the coil is energized, and the core being provided with a narrow air-gap to cause a rapid demagnetization upon opening the energizing circuit thereby producing a rapid transformation of the stored magnetic energy into a current of increased volume.

In testimony that I claim the foregoing as my invention I affix my signature in the presence of two witnesses, this 28th day of September, 1911.

CHESTER H. THORDARSON.

Witnesses:

WILLIAM D. STALE,

G. E. DOWLE.